United States Patent [19]

Hiraike

[11] 4,396,271

[45] Aug. 2, 1983

[54] CAMERA DIAPHRAGM CONTROL METHOD

[75] Inventor: Fumiaki Hiraike, Hachioji, Japan

[73] Assignee: Konishiroku Photo Industry Co., Ltd., Tokyo, Japan

[21] Appl. No.: 283,813

[22] Filed: Jul. 16, 1981

[30] Foreign Application Priority Data

Jul. 28, 1980 [JP] Japan ................................ 55-104054

[51] Int. Cl.³ .............................................. G03B 9/02
[52] U.S. Cl. .................................................... 354/271
[58] Field of Search ................. 354/26, 29, 30, 40–44, 354/228–232, 271; 350/266

[56] References Cited

U.S. PATENT DOCUMENTS 4,079,386  3/1978  Murakami et al. ............. 354/271 X
4,307,948 12/1981  Kitamura et al. ...................... 354/42
4,311,373  1/1982  Kranz ............................. 354/271 X Primary Examiner—William B. Perkey
Attorney, Agent, or Firm—Jordan B. Bierman; Linda Bierman

[57] ABSTRACT

Accurate control of a movable diaphragm member of a camera in which, for each photographic exposure operation, the diaphragm member is set in motion from an initial starting position and is stopped in said motion at a prescribed position corresponding to a desired stopped down value for the photographic exposure by a movable diaphragm stopper, is performed by determining the moving speed of the diaphragm member, and using that speed determination to compute either the time remaining until the stopper should be actuated to stop the diaphragm member at a prescribed stopped down position, or the positional location of the diaphragm member at which the stopper should be actuated for that purpose.

2 Claims, 3 Drawing Figures

CAMERA DIAPHRAGM CONTROL METHOD

BACKGROUND OF THE INVENTION

1. Field of the Invention

The present invention relates to a camera diaphragm control method.

2. Description of the Prior Art

Conventional diaphragm control has thus far been accomplished such that a diaphragm member begins to operate when the camera diaphragm size is determined and set, and simultaneously the amount of diaphragm member movement is detected by, for example, counting a series of pulses. The diaphragm operation stopper is then actuated and the diaphragm member strikes the stopper, stopping its motion, when the diaphragm member reaches the point of prescribed diaphragm value (e.g., the proper number of pulses).

In the foregoing method, the diaphragm operation stopper begins its motion after the diaphragm member has reached the point of the prescribed diaphragm value; there is therefore inevitably a difference between the actual diaphragm opening and the prescribed amount thereof. This is never desirable because it leads to an error when the diaphragm is stopped down. To solve this, many methods have been adopted, such as ones in which the operational speed of the diaphragm operation stopper is increased or the operational speed of the diaphragm member is decreased. If the operational speed of the diaphragm operation stopper is increased, the kinetic energy of the relative members is increased and, when stopped in operation, significant noise and impact result thereby shortening the life of the members. If, on the other hand, the operational speed of the diaphragm member is decreased, a photographing opportunity is sometimes lost.

Moreover, to eliminate delays in the action of these operation members, a method has been devised wherein, for example, the diaphragm operation stopper is actuated before the diaphragm member reaches the point of prescribed diaphragm value (e.g., before two pulses are given). In this method, it is sufficient if the operational speed of the diaphragm member is predeterminately fixed; however, in practice, there are sizable variations in such speed, from which errors result.

Generally, the operational speed of a member is determined in accordance with the force imparted thereto and the inertia and friction of the member. With respect to a diaphragm operation stopper, the force thereon is generated by a spring or a solenoid. The effect of its inertia on its moving speed can be minimized once the shape and material of the member are determined, and the friction thereof will not appreciably fluctuate if the member is assembled and shakedown-tested once. The diaphragm operation stopper will always function at a stable speed with little variation.

On the other hand, the force and inertia associated with a diaphragm member of an interchangeable lens significantly fluctuate so that its speed is sharply affected by the accelerated velocity at its initial stage of operation (where the diaphragm is fully opened) and at the point in time at which the diaphragm is stopped down.

SUMMARY OF THE INVENTION

An object of the present invention is to provide consistent and highly accurate control of the diaphragm, even where the operating speed of a diaphragm member fluctuates.

It is a further object of the invention to provide a method of controlling the operation of a movable diaphragm member, whose movement is to be stopped by a diaphragm stopper having a predetermined operating interval, by determining the appropriate position along the path of movement of the member at which the stopper should be actuated to thereby stop movement of the diaphragm member at a prescribed position corresponding to the desired stopped down diaphragm position, and then actuating the stopper at said appropriate position.

It is another object of the invention to provide a method of controlling the operation of a movable diaphragm member, whose movement is to be stopped by a diaphragm stopper having a predetermined operating interval, by determining the time for the diaphragm member to reach the desired stopped down position from its then present position, comparing the time so determined with the predetermined operating interval of the stopper, and actuating the stopper when said comparison indicates agreement between said time and said interval.

Further objects, features and advantages of the invention will be more fully appreciated by reference to the following detailed description of presently preferred, but nonetheless illustrative, embodiments in accordance with the present invention when taken in conjection with the accompanying drawing.

DESCRIPTION OF THE PREFERRED EMBODIMENTS

Figure 1:
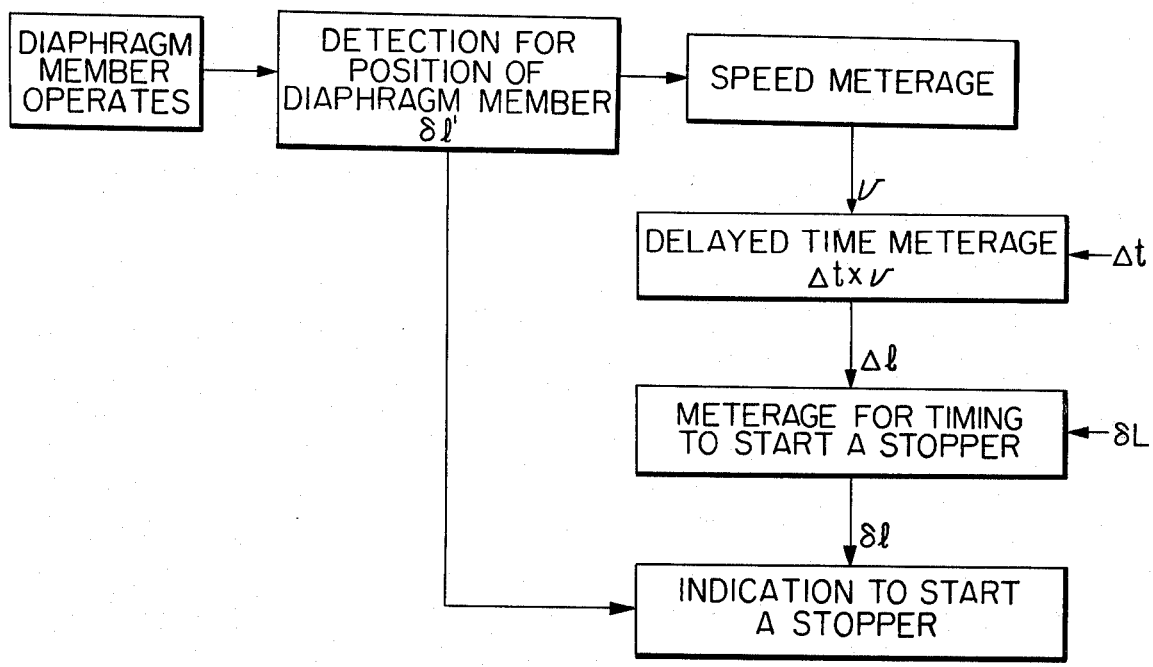
FIGS. 1 and 2 are block diagrams illustrating examples of the present invention.

The examples of the invention are now explained in detail by reference to the block diagrams seen in FIGS. 1 and 2. Firstly, FIG. 1 shows an embodiment of the invention wherein the position and speed of the diaphragm member are detected. For example, if the system is such that the amount by which the diaphragm has moved or been stopped down is indicated by the number of pulses output, the position thereof can be detected by counting the number of pulses. Where the number of pulses output in a given short period of time $\delta t$ is defined as "n", the diaphragm member operation speed $v$ is:

$$v = Kn/\delta t,$$

wherein "K" is a constant.

This speed detection can be performed continuously until the diaphragm member reaches an earlier position some determinable distance from a prescribed position corresponding to the preferred or desired stopped down aperture value of the diaphragm, or can alternatively be performed only in the area of said earlier position. It is best that the distance over which speed detection is performed be kept as small as possible so as to minimize diaphragm member speed changes between said earlier position and the predetermined position to which the diaphragm is to be stopped down (corresponding to the desired or prescribed aperture value at which the photograph is to be taken). On the other hand, this distance must be sufficiently long so that the diaphragm member may be stopped at a position short of the prescribed or stopped down position even if the diaphragm operation stopper begins to move only when the diaphragm member reaches the so-called earlier position.

Now define the operation period of the diaphragm operation stopper as $\Delta t$; this value is sufficiently small so that speed changes of the diaphragm member during that period of time are substantially negligible. The product of the diaphragm member operation speed v and the operating period $\Delta t$ of the diaphragm operation stopper yields the distance of movement $\Delta l$ of the diaphragm member between the starting point of the diaphragm operation stopper and the stop point (the prescribed position) of the diaphragm member, as follows:

$$\Delta l = \Delta t \times v.$$

When the total desired or prescribed distance of movement of the diaphragm member (to the prescribed or stopped down position) is defined as $\delta L$, the equation $$\delta L - \Delta l = \delta l$$

indicates that operation of the diaphragm operation stopper can be started when the diaphragm member reaches a position at a distance $\delta l$ from the prescribed stopped down position.

Figure 2:
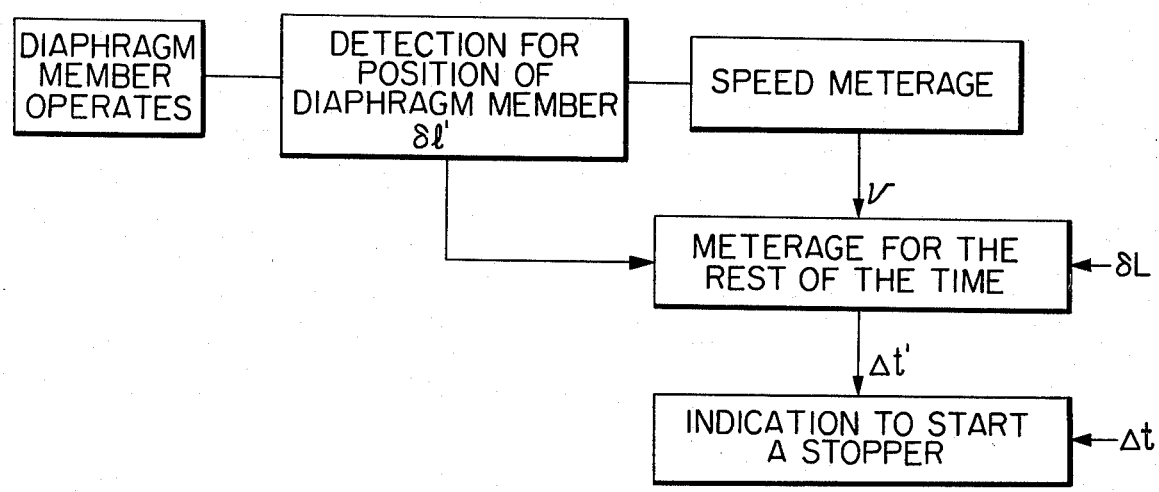

The block diagram of FIG. 2 shows another embodiment of the invention wherein the diaphragm is controlled in accordance with time coordinates. In this method, a speed v, at the time when the diaphragm member has moved a distance of $\delta l'$, is obtained and, on the basis of the calculated speed v and the prescribed distance $\delta L$, the remaining period of diaphragm member movement $\Delta t'$ is determined using the equation $$\frac{\delta L - \delta l'}{v} = \Delta t'.$$

When the time period $\Delta t'$ becomes equal to the diaphragm stopper operating period $\Delta t$, an instruction to actuate or begin operation of the diaphragm operation stopper can be generated.

Figure 3:
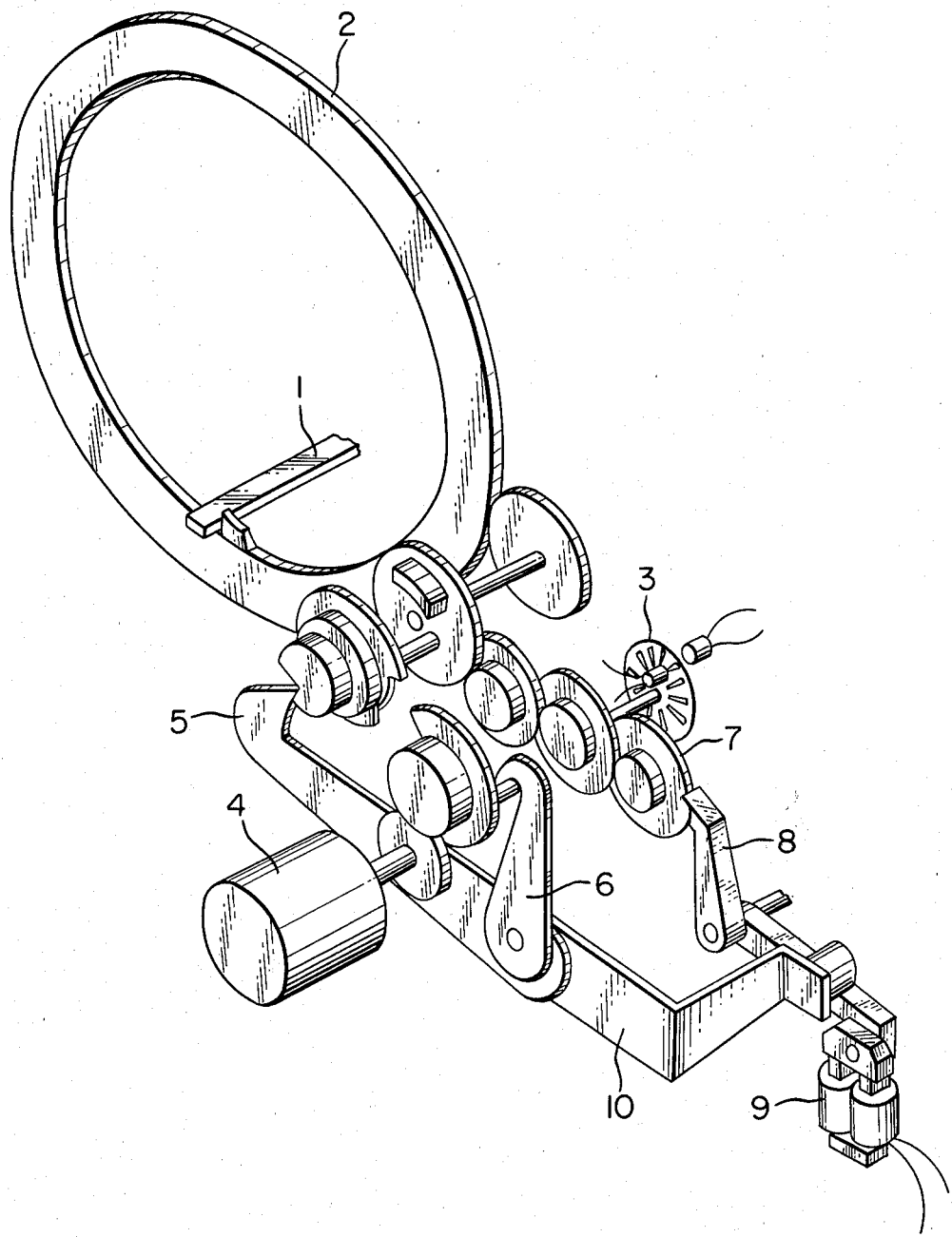
FIG. 3 is an elevated perspective view of a diaphragm mechanism to which the invention may be applied.

FIG. 3 shows an elevated perspective view of a diaphragm mechanism to which this invention can be applied. In FIG. 3, a lever 1 connected to a diaphragm member (not shown) contacts a diaphragm driving ring 2, and a pulse generator 3 for detecting the position of the diaphragm member is linked to driving ring 2. When a signal to stop the diaphragm member is generated, a stop magnet or solenoid 9 operates to stop a gear wheel 7 by a hook stopper 8. Hook stopper 8 is disengaged by a lever 10. The mechanism further includes a first start hook 5, a second start hook 6, and a start charge motor 4.

In accordance with the the inventive diaphragm control method disclosed by way of the foregoing examples, accurate diaphragm control is advantageously performed at high speed.

What is claimed is:

1. A method of controlling a movable diaphragm member of a camera in which, for each photographic exposure operation, the diaphragm member is set in motion from an initial starting position and is stopped in said motion at a prescribed position corresponding to a desired stopped down value for the photographic exposure by a movable diaphragm stopper actuatable to stop further movement of the diaphragm member a predetermined operating time following actuation of the stopper, said method comprising the steps of:

detecting the present position of the moving diaphragm member;

determining the moving speed of the diaphragm member utilizing said present position;

computing, utilizing the diaphragm member speed and the predetermined operating time of the diaphragm stopper, the distance of diaphragm member motion between the prescribed position and an earlier position at which the diaphragm stopper should be actuated to thereafter stop diaphragm member motion at the prescribed position; and actuating the diaphragm stopper when the diaphragm member reaches a position at the computed distance from the prescribed position.

2. A method of controlling a movable diaphragm member of a camera in which, for each photographic exposure operation, the diaphragm member is set in motion from an initial starting position and is stopped in said motion at a prescribed position corresponding to a desired stopped down value for the photographic exposure by a movable diaphragm stopper actuatable to stop further movement of the diaphragm member a predetermined operating time following actuation of the stopper, said method comprising the steps of:

detecting the present position of the moving diaphragm member;

determining the moving speed of the diaphragm member utilizing said present position;

computing, utilizing the diaphragm member speed, the time for the diaphragm member to reach the prescribed position from its present position;

comparing said computed time for the diaphragm member to reach the prescribed position with the predetermined operating time of the diaphragm stopper; and actuating the diaphragm stopper when the said computed time and the said predetermined time are the same.

* * * * *